United States Patent
Suyama (10) Patent No.: US 11,992,962 B2
(45) Date of Patent: May 28, 2024

(54) ROBOT AND ROBOT SYSTEM

(71) Applicant: FANUC CORPORATION, Yamanashi (JP)

(72) Inventor: Keita Suyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/498,524

(22) Filed: Oct. 11, 2021

(65) Prior Publication Data
US 2022/0024043 A1    Jan. 27, 2022

Related U.S. Application Data (63) Continuation of application No. 16/174,611, filed on Oct. 30, 2018, now Pat. No. 11,565,421.

(30) Foreign Application Priority Data

Nov. 28, 2017  (JP) .................... 2017-227419

(51) Int. Cl.
*B25J 9/02* (2006.01)
*B25J 5/00* (2006.01)
(Continued)

(52) U.S. Cl.
CPC ............. *B25J 9/1697* (2013.01); *B25J 5/007* (2013.01); *B25J 9/046* (2013.01); *B25J 9/1641* (2013.01); *B25J 17/02* (2013.01); *B25J 19/023* (2013.01)

(58) Field of Classification Search
CPC . B25J 17/02; B25J 19/023; B25J 5/007; B25J 9/046; B25J 9/1641; B25J 9/1697
See application file for complete search history.

(56) References Cited

U.S. PATENT DOCUMENTS

| 4,639,878 A | 1/1987 | Day et al. |
| 5,219,264 A * | 6/1993 | McClure ............... G06T 1/0014 414/730 |

(Continued)

FOREIGN PATENT DOCUMENTS

| CN | 102165880 A | 8/2011 |
| EP | 0204516 A2 | 12/1986 |

(Continued)

OTHER PUBLICATIONS

Wallace, Zachary Joseph; Office Action issued in U.S. Appl. No. 16/174,611; Aug. 17, 2022; 11 pages.

(Continued)

*Primary Examiner* — Jaime Figueroa
*Assistant Examiner* — Zachary Joseph Wallace
(74) *Attorney, Agent, or Firm* — Renner, Otto, Boisselle & Sklar, LLP (57) ABSTRACT

A robot includes a wrist unit that has a tool attached to a distal end face thereof and that changes the orientation of the tool, the tool performing work on a work target device secured to an installation surface; and a movable unit that changes the three-dimensional position of the wrist unit. The movable unit includes an arm that has a longitudinal axis and the wrist unit is attached to the distal end thereof, and a visual sensor that has a field of view oriented in a direction intersecting the longitudinal axis of the arm is attached to the a positon closer to the base end than the distal end face of the wrist unit is.

8 Claims, 6 Drawing Sheets

(51) Int. Cl.
*B25J 9/04* (2006.01)
*B25J 9/16* (2006.01)
*B25J 17/02* (2006.01)
*B25J 19/02* (2006.01)

(56) References Cited

U.S. PATENT DOCUMENTS

| | | |
|---|---|---|
| 5,499,306 A | 3/1996 | Sasaki et al. |
| 2004/0019406 A1 | 1/2004 | Wang et al. |
| 2004/0034976 A1 | 2/2004 | Wakizako et al. |
| 2004/0117065 A1 | 6/2004 | Wang et al. |
| 2004/0143421 A1 | 7/2004 | Wang et al. |
| 2004/0162637 A1 | 8/2004 | Wang et al. |
| 2005/0021182 A1 | 1/2005 | Wang et al. |
| 2005/0021183 A1 | 1/2005 | Wang et al. |
| 2005/0021187 A1 | 1/2005 | Wang et al. |
| 2005/0027400 A1 | 2/2005 | Wang et al. |
| 2005/0240310 A1 | 10/2005 | Wang et al. |
| 2006/0082642 A1 | 4/2006 | Wang et al. |
| 2007/0021871 A1 | 1/2007 | Wang et al. |
| 2007/0112464 A1 | 5/2007 | Wang et al. |
| 2008/0029536 A1 | 2/2008 | Wang et al. |
| 2008/0065268 A1 | 3/2008 | Wang et al. |
| 2008/0201017 A1 | 8/2008 | Wang et al. |
| 2008/0255703 A1 | 10/2008 | Wang et al. |
| 2009/0105881 A1 | 4/2009 | Wang et al. |
| 2009/0125146 A1* | 5/2009 | Zhang ................ G05B 19/423 700/253 |
| 2010/0158656 A1 | 6/2010 | Seavey |
| 2012/0072024 A1 | 3/2012 | Wang et al. |
| 2012/0265345 A1 | 10/2012 | Nakahara |
| 2013/0085604 A1 | 4/2013 | Irie et al. |
| 2013/0304257 A1 | 11/2013 | Wang et al. |
| 2014/0144470 A1 | 5/2014 | Sewell et al. |
| 2014/0156069 A1 | 6/2014 | Wang et al. |
| 2016/0177540 A1* | 6/2016 | Penza ........................ E02F 3/96 296/24.32 |
| 2016/0318187 A1 | 11/2016 | Tan et al. |
| 2016/0327383 A1* | 11/2016 | Becker ................ G01B 11/005 |
| 2016/0349741 A1 | 12/2016 | Takahashi et al. |
| 2017/0087731 A1* | 3/2017 | Wagner .................... G08B 5/36 |
| 2018/0071917 A1 | 3/2018 | Wang et al. |
| 2018/0093380 A1 | 4/2018 | Yoshida et al. |
| 2018/0101166 A1 | 4/2018 | Aldridge et al. |
| 2018/0215044 A1* | 8/2018 | Maruyama ................ G06T 7/74 |
| 2018/0222058 A1* | 8/2018 | Mizobe ..................... B25J 9/163 |
| 2019/0061149 A1* | 2/2019 | Inagaki .................. B25J 11/005 |
| 2019/0077015 A1* | 3/2019 | Shibasaki ................ B25J 9/163 |
| 2019/0091869 A1* | 3/2019 | Yamazaki ................ B25J 15/08 |
| 2019/0137969 A1* | 5/2019 | Watanabe .......... G05B 19/4063 |
| 2020/0238526 A1* | 7/2020 | Nammoto ................ B25J 9/163 |
| 2020/0387150 A1 | 12/2020 | Aldridge et al. |
| 2021/0003993 A1* | 1/2021 | Hashimoto ............ B25J 13/025 |
| 2021/0023702 A1* | 1/2021 | Lipay ..................... B25J 9/1694 |

FOREIGN PATENT DOCUMENTS

| | | |
|---|---|---|
| EP | 2511054 A2 | 10/2012 |
| EP | 2578366 A2 | 4/2013 |
| JP | S62-054115 A | 3/1987 |
| JP | H06-218682 A | 8/1994 |
| JP | 2767417 B2 | 6/1998 |
| JP | H11-58273 A | 3/1999 |
| JP | 2003-211381 A | 7/2003 |
| JP | 2003-231078 A | 8/2003 |
| JP | 2009-279663 A | 12/2009 |
| JP | 2010-162635 A | 7/2010 |
| JP | 2012-223840 A | 11/2012 |
| JP | 2013-078825 A | 5/2013 |
| JP | 5455810 B2 | 3/2014 |
| JP | 2016-221622 A | 12/2016 |
| JP | 2017-052045 A | 3/2017 |
| JP | 2017-052053 A | 3/2017 |
| JP | 2018-058142 A | 4/2018 |
| WO | WO-2004012018 A2 | 2/2004 |
| WO | WO-2006044847 A2 | 4/2006 |
| WO | WO-2016113836 A1 | 7/2016 |

OTHER PUBLICATIONS

Takeichi, Masahiro; Notice of Reasons for Refusal for Japanese Patent Application No. 2017-227419; Nov. 5, 2019; 5 pages.

Pasona Group Inc .; Search Report by Registered Search Organization; Japanese Patent Application No. 2017-227419; Oct. 31, 2019; 20 pages.

Shinohara, Masayuki; Notice of Reasons for Refusal; Japanese Patent Application No. 2020- 028451; dated Jan. 5, 2021; 4 pages.

* cited by examiner

ROBOT AND ROBOT SYSTEM

CROSS-REFERENCE TO RELATED APPLICATIONS

This application is a continuation of U.S. patent application Ser. No. 16/174,611. U.S. patent application Ser. No. 16/174,611 is incorporated herein by reference.

TECHNICAL FIELD

The present invention relates to a robot and a robot system.

BACKGROUND ART

In a known robot system in the related art in which workpieces are supplied to and extracted from a machining apparatus by a robot, even if the robot is moved, and, as a result, the relative positional relationship between the machining apparatus and the robot changes, the relative positional relationship is measured by capturing an image of a visual target provided on the outer surface of the machining apparatus with a camera provided on the distal end of a robot arm, and the operating position of the robot is compensated on the basis of the measured relative positional relationship (for example, see Patent Literature Japanese Unexamined Patent Application, Publication No. Hei 11-58273 and Japanese Unexamined Patent Application, Publication No. Sho 62-54115).

SUMMARY

A robot includes a wrist unit that has a tool attached to a distal end face thereof and that changes the orientation of the tool, the tool performing work on a work target device secured to an installation surface; and a movable unit that changes the three-dimensional position of the wrist unit. The movable unit includes an arm that has a longitudinal axis and the wrist unit is attached to the distal end thereof. A visual sensor that has a field of view oriented in a direction intersecting the longitudinal axis of the arm is attached to a positon closer to the base end than the distal end face of the wrist unit is.

A robot system includes a work target device secured to an installation surface; any one of the above-described robots that performs work on the work target device; and a compensating unit that compensates the operating position of the robot on the basis of the relative positional relationship between the robot and the work target device measured by capturing, with the visual sensor, an image of a visual target provided at a position where the relative positional relationship with respect to the work target device is predetermined.

DETAILED DESCRIPTION

Figure 1:
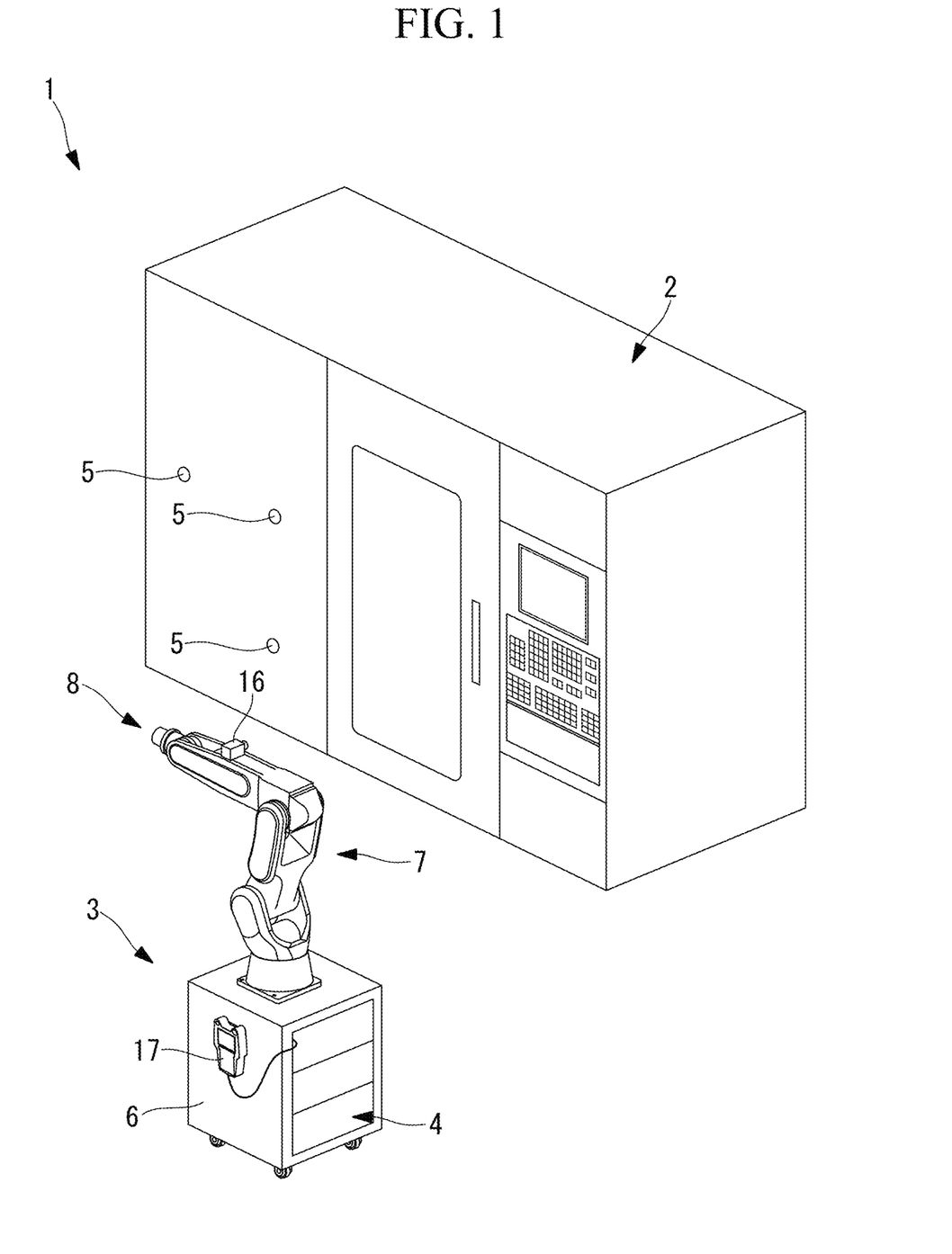
FIG. 1 is a diagram showing the overall configuration of a robot system according to an embodiment of the present invention.

A robot 3 and a robot system 1 according to an embodiment of the present invention will be described below with reference to the drawings. As shown in FIG. 1, the robot system 1 according to this embodiment includes a machining apparatus (work target device) 2 for cutting a workpiece, the robot 3 that supplies and extracts the workpiece to and from the machining apparatus 2, and a control unit 4 that controls the robot 3. The control unit 4 includes a compensating unit (not shown, described below) therein.

The machining apparatus 2 is secured to the floor surface (installation surface) and performs, with a tool attached to a main shaft, cutting or another operation on a workpiece (not shown) supplied by the robot 3. Visual targets 5 are provided at, for example, three positions on the outer surface facing the robot 3 (i.e., the front side), among the outer surfaces of the machining apparatus 2. The visual targets 5 may be, for example, marks, such as circles, whose geometric center position or brightness center positon can be accurately detected when an image thereof is captured by a visual sensor 16 (described below). The visual targets 5 are fixed to the outer surface of the machining apparatus 2 such that the center positions thereof precisely coincide with known coordinate positions.

Figure 2:
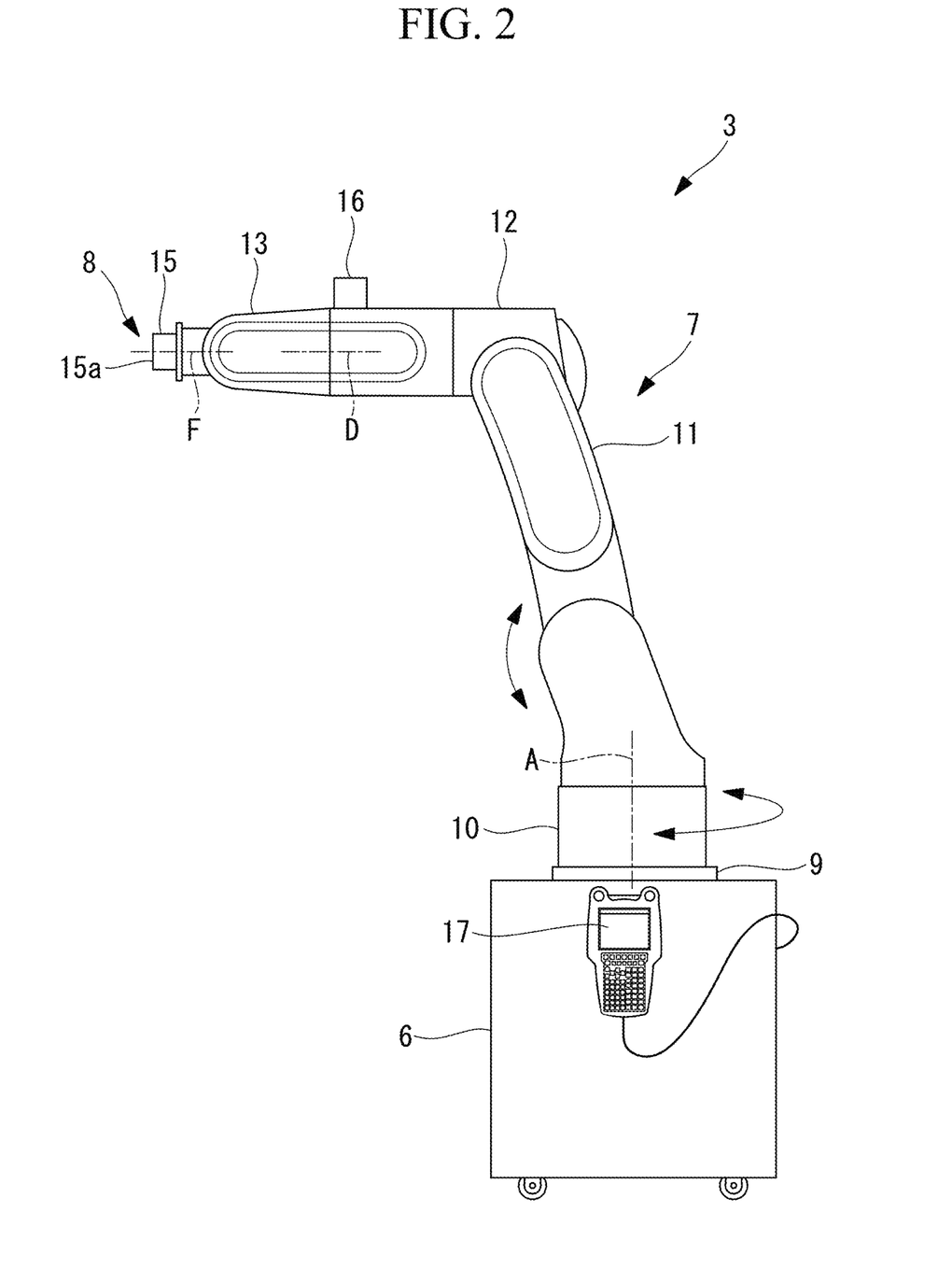
FIG. 2 is a side view showing an example of a robot according to the embodiment of the present invention provided in the robot system in FIG. 1.
Figure 3:
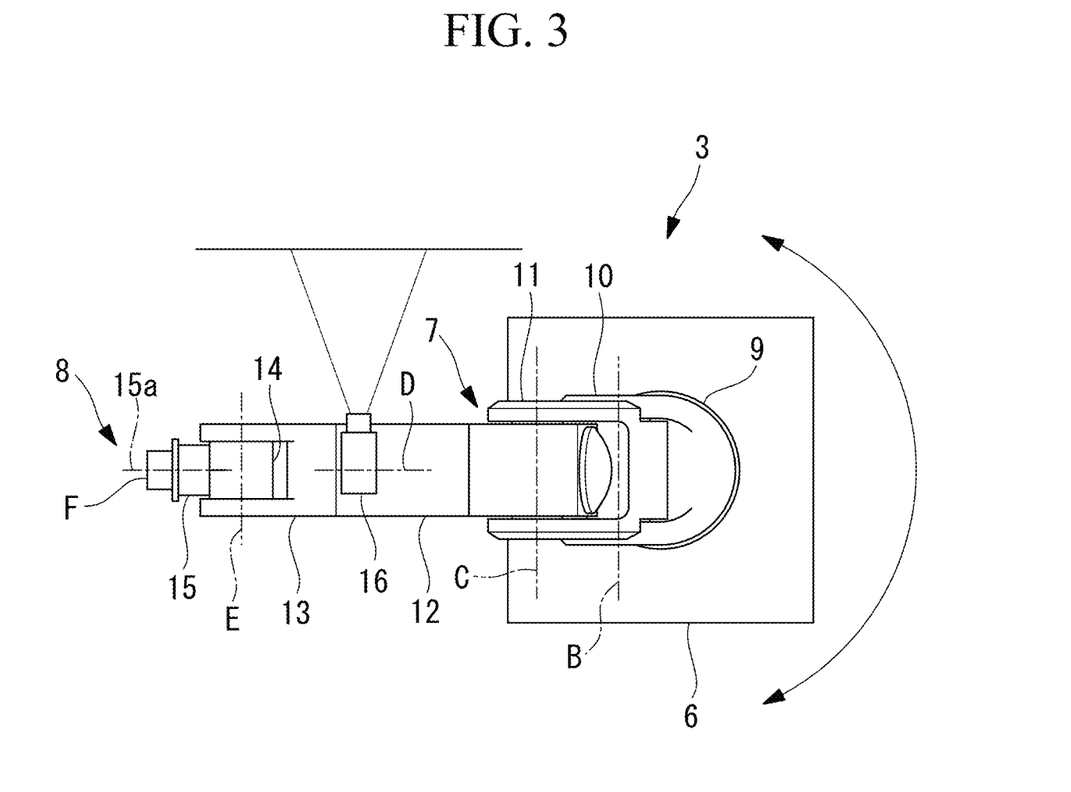
FIG. 3 is a plan view of the robot in FIG. 2.

The robot 3 includes a dolly (truck) 6 that can travel on the floor surface in any direction, a movable unit 7 mounted on the dolly 6, and a wrist unit 8 attached to the distal end of the movable unit 7. As shown in FIGS. 2 and 3, the movable unit 7 includes a base 9 fixed to the dolly 6, a swivel body 10 that is supported so as to be rotatable about a vertical first axis A with respect to the base 9, a first arm (arm) 11 that is supported so as to be rotatable about a horizontal second axis B with respect to the swivel body 10, and a second arm (arm) 12 that is supported at the distal end of the first arm 11 so as to be rotatable about a horizontal third axis C.

The wrist unit 8 includes a first wrist shaft 13 that is attached to the distal end of the second arm 12 and that is supported so as to be rotatable about a fourth axis D located along a plane perpendicular to the third axis C, a second wrist shaft 14 that is supported so as to be rotatable about a fifth axis E perpendicular to the fourth axis D, and a third wrist shaft 15 that is supported so as to be rotatable about a sixth axis F perpendicular to the fifth axis E. A distal end face 15a that is rotated about the sixth axis F is provided at the distal end of the third wrist shaft 15, and a hand (not shown) for gripping a workpiece is attached to the distal end face 15a.

The robot 3 according to this embodiment includes a camera (visual sensor) 16 attached to the second arm 12, which is located closer to the base end than the distal end face 15a is. The camera 16 is disposed such that the field of view thereof is oriented in a direction parallel to a plane substantially perpendicular to the fourth axis D, which is the longitudinal axis of the second arm 12.

The compensating unit processes the image of the visual targets 5 captured by the camera 16 to detect the center positions of the visual targets 5 and measures the relative positional relationship between the robot 3 and the machining apparatus 2 on the basis of the detected center positions. The compensating unit compensates, on the basis of the measured relative positional relationship, the preliminarily taught or programmed position where the robot 3 performs work-piece supplying and extracting operations. Reference sign 17 in FIG. 2 is a teaching control panel.

Figure 4:
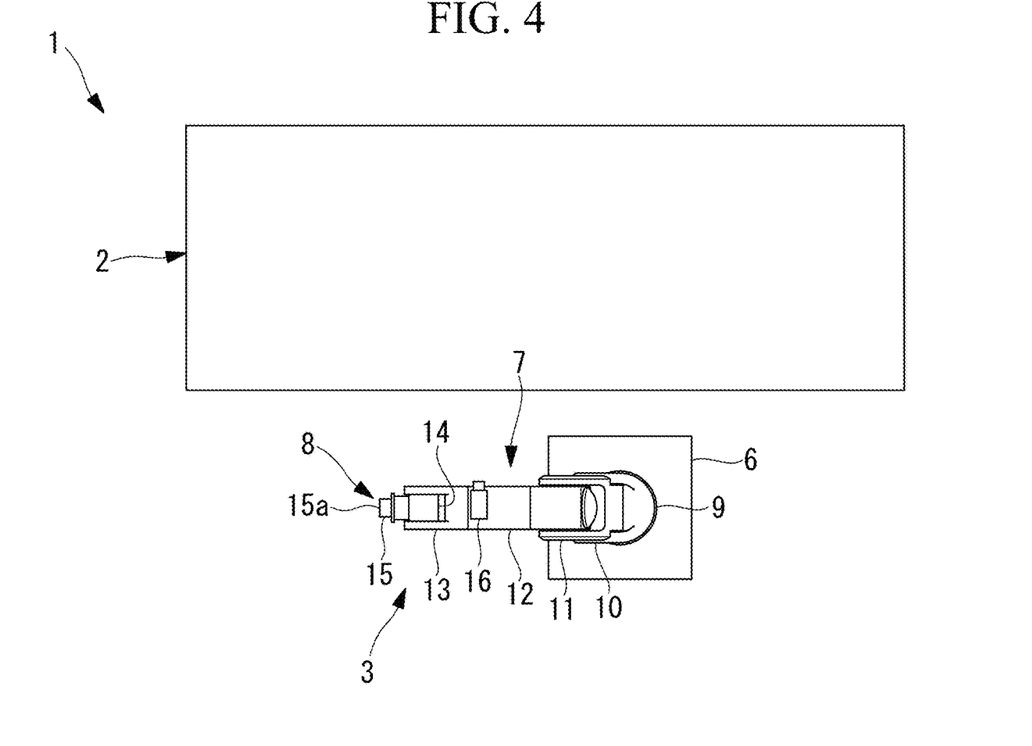
FIG. 4 is a plan view showing a state in which the robot in FIG. 2 is positioned with respect to a machining apparatus.

The operation of the thus-configured robot 3 and robot system 1 according to this embodiment will be described below. As shown in FIG. 4, in the robot system 1 according to this embodiment, in a state in which the robot 3 is positioned at a predetermined position with respect to the machining apparatus 2, a teaching operation is performed on the robot 3, and a teaching program, in which the robot 3 supplies workpieces to and extracts the cut workpieces from the machining apparatus 2, is generated.

When the control unit 4 executes the generated teaching program, a series of tasks including supplying a workpiece with the robot 3, cutting the workpiece with the machining apparatus 2, and extracting the workpiece with the robot 3 is automatically performed. A case where the robot 3 is moved, by moving the dolly 6, to another position, for example, a position where the robot 3 supplies and extracts workpieces to and from another machining apparatus 2, and then the robot 3 is moved back to a position where it can supply and extract workpieces to and from the original machining apparatus 2 will be described.

Figure 5:
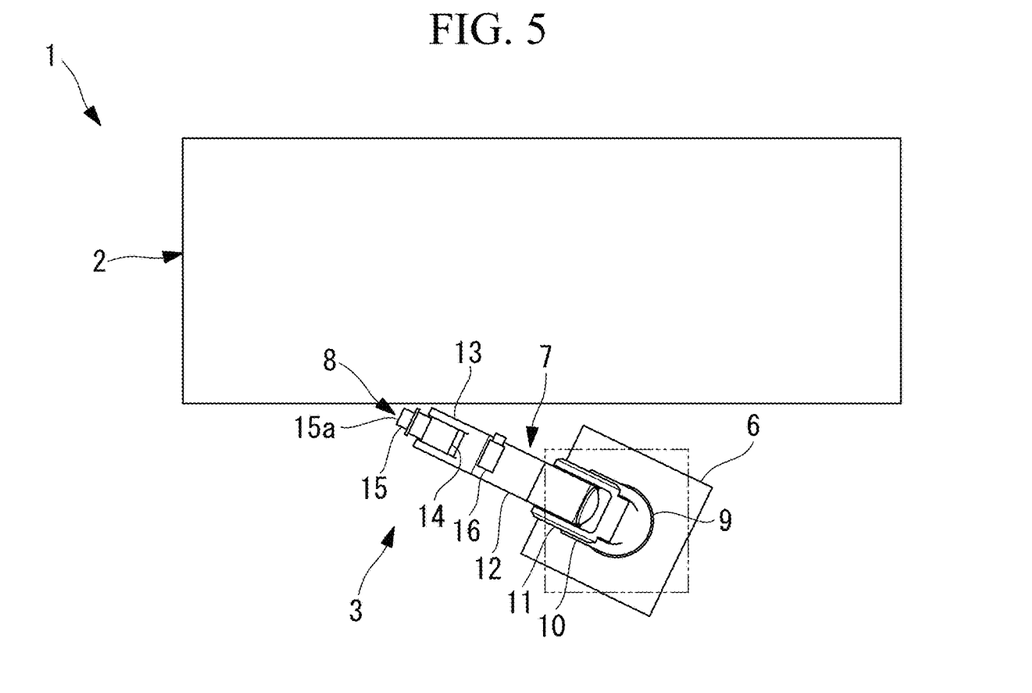
FIG. 5 is a plan view showing a state in which the robot in FIG. 2 is repositioned with respect to the machining apparatus after being moved.

In this case, as shown in FIG. 5, when the dolly 6, indicated by the solid line, is not exactly located at the predetermined position of the robot 3, indicated by a chain line, where the original teaching operation was performed, the robot 3 cannot properly supply and extract workpieces to and from the machining apparatus 2 even if the teaching program is executed. In this embodiment, even if the dolly 6 is provided so as to be rotated with respect to the machining apparatus 2, by capturing an image of the visual targets 5 with the camera 16, it is possible to automatically detect a positional or rotational shift of the dolly 6 to compensate the operating position in the teaching program. When the positional or rotational shift of the dolly 6 is large, and the visual targets 5 cannot be contained in the field of view of the camera 16 with a predetermined robot operation for capturing an image of the visual targets 5, the robot operation is automatically changed so that the visual targets 5 are contained in the field of view of the camera 16.

Figure 7:
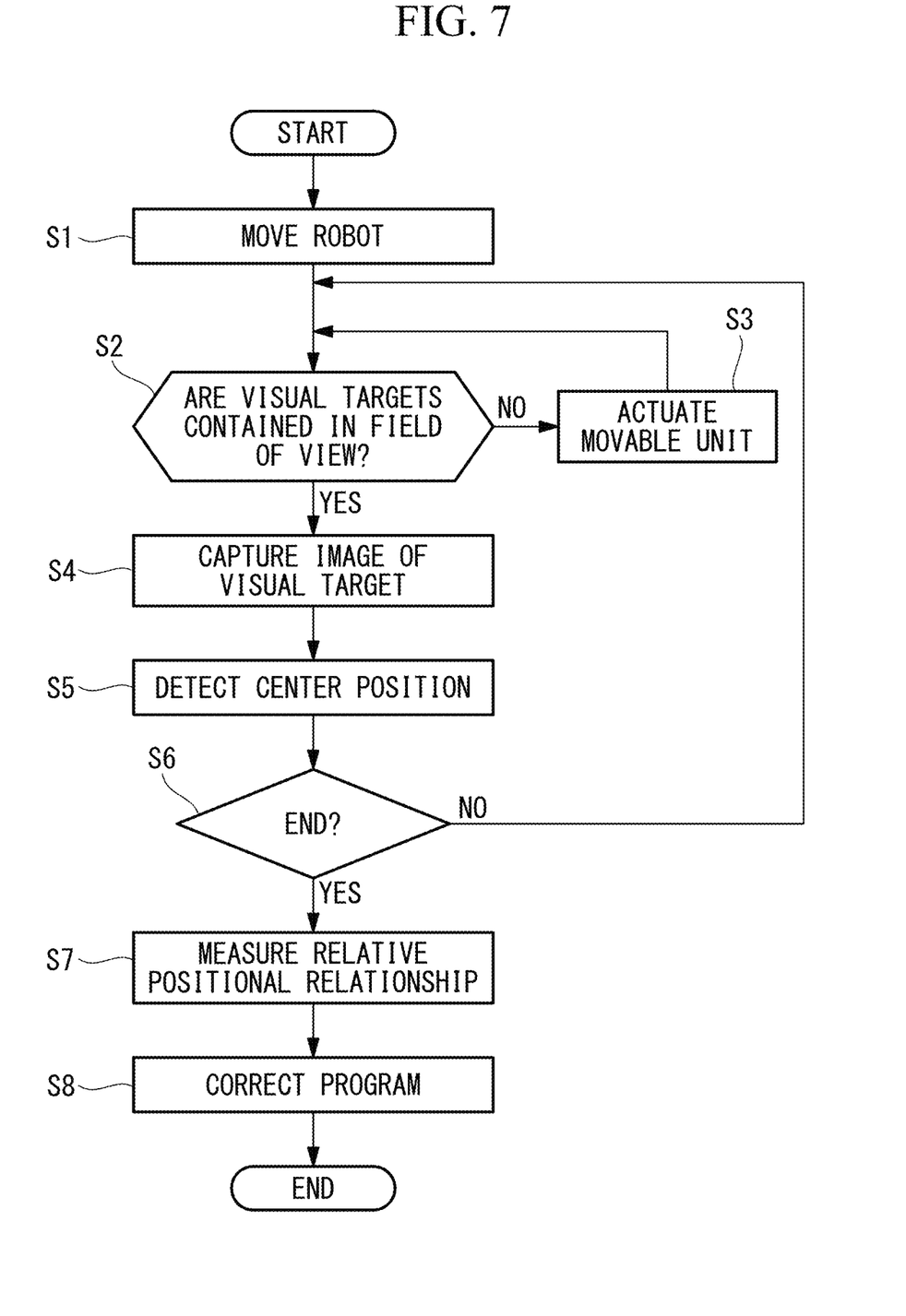
FIG. 7 is a flowchart for explaining the operation of the robot system in FIG. 1.

Specifically, as shown in FIG. 7, when the robot 3 is moved (step S1), it is determined whether or not the visual targets 5 on the front side of the machining apparatus 2 are contained in the field of view of the camera 16 (step S2). When the visual targets 5 are not contained in the field of view of the camera 16, in a state in which the robot 3 is not exactly located at the predetermined position and in which the position of the dolly 6 is shifted, the first arm 11 is rotated about the second axis B, and the second arm 12 is rotated about the third axis C (step S3), causing the robot 3 to automatically operate such that the visual targets 5 on the front side of the machining apparatus 2 are contained in the field of view of the camera 16.

Figure 6:
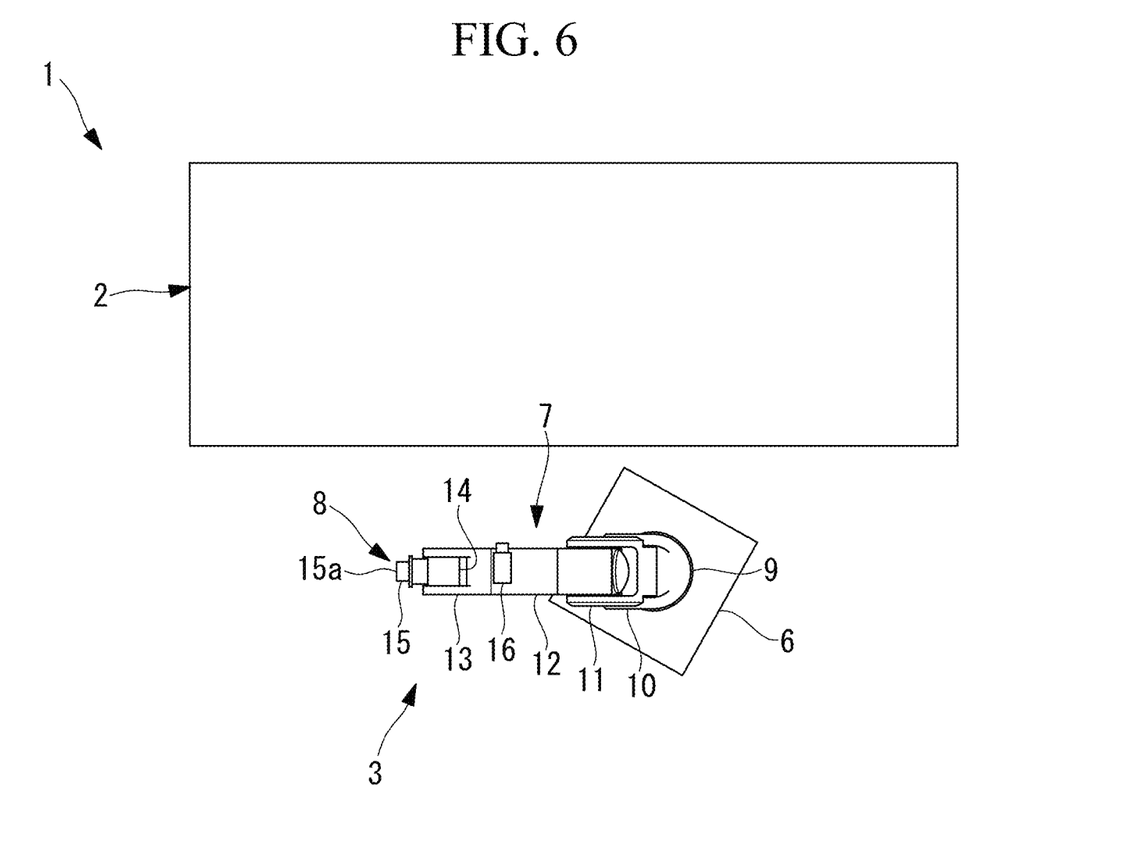
FIG. 6 is a plan view showing a state in which a first arm and a second arm of the robot in FIG. 2 are positioned so as to be substantially parallel to the front side of the machining apparatus.

If the visual targets 5 are not contained in the field of view of the camera 16 even after the first arm 11 and the second arm 12 are moved, as shown in FIG. 6, the swivel body 10 is automatically rotated about the first axis A such that the fourth axis D of the second arm 12 is substantially parallel to the front side of the machining apparatus 2 to keep the visual targets 5 in the field of view of the camera 16. As a result, the camera 16 attached to the distal end of the second arm 12 is directed in a direction in which the field of view thereof is oriented towards the front side of the machining apparatus 2. Then, the camera 16 is actuated in a state in which the visual targets 5 are kept in the field of view of the camera 16, and an image of the visual targets 5 is captured to acquire an image (step S4).

The image of the visual targets 5 is captured in two directions, at different angles with respect to the normal to the front side of the machining apparatus 2. This makes it possible to detect the coordinates of the visual targets 5 in a direction parallel to the front side of the machining apparatus 2 from the positions of the visual targets 5 in the images, and to detect the coordinates of the visual targets 5 in a direction perpendicular to the front side of the machining apparatus 2 from the two images acquired in two directions at different angles.

The acquired images are forwarded to the compensating unit and are processed in the compensating unit, and the center positions thereof are detected (step S5). The process from step S2 is repeated until three center positions of the visual targets 5 are acquired (step S6).

In the compensating unit, the relative positional relationship between the robot 3 and the machining apparatus 2 is obtained from the acquired three center positions (step S7). In the compensating unit, the operating position in the previously taught teaching program is compensating on the basis of the obtained relative positional relationship (step S8). Thus, the robot system 1 according to this embodiment provides an advantage in that, when, for example, the robot 3 is moved, by actuating the dolly 6, between different machining apparatuses 2 to be used by them in a shared manner, even if the dolly 6 is not positioned at exactly the same position with respect to each machining apparatus 2, it is possible to compensate and reuse a previously generated teaching program, instead of performing a teaching operation again.

Hence, it is possible to accurately supply and extract workpieces to and from each machining apparatus 2, and the robot 3 only needs to be fastened with a simple fastener, not with an anchor bolt.

In the robot 3 and the robot system 1 according to this embodiment, because the camera 16 is not attached to the distal end face 15*a* of the wrist unit 8, the camera 16 cannot be operated with six degrees of freedom. However, by mounting the camera 16 to the distal end of the second arm 12, the camera 16 can be operated with three degrees of freedom in a wide operating area. Because the camera 16 is disposed such that the field of view thereof is oriented in a direction parallel to a plane perpendicular to the fourth axis D, even when the dolly 6 is disposed at an angle to the machining apparatus 2, the fourth axis D can be arranged parallel to the machining apparatus 2, and thus, it is possible to easily capture images of the visual targets 5 disposed at a plurality of positions on the front side of the machining apparatus 2. When the dolly 6 is disposed at an angle to the machining apparatus 2, and when images of the visual targets 5 cannot be captured in this state, the swivel body 10 is manually or automatically rotated about the first axis A, and the images of the visual targets 5 are captured.

As a result, because the camera 16 is not attached to the distal end face 15*a* of the wrist unit 8, the dimension of the tool, including the hand, attached to the distal end face 15*a*, can be minimized, leading to an advantage in that insertion into the machining apparatus 2 is easy. Because the camera 16 is not attached to the distal end face 15*a*, it is possible to prevent the camera 16 from taking up the weight capacity. In other words, it is advantageous in that there is no need to reduce the weight of other tools, such as the hand, due to the weight of the camera 16.

Because the wrist unit 8 inserted into the interior of the machining apparatus 2 is highly likely to be splattered with the cutting fluid, by mounting the camera 16 to the second arm 12, which is away from the wrist unit 8, the risk of the camera 16 being splattered with the cutting fluid is reduced, thus maintaining the soundness of the camera 16, which is advantageous.

The camera 16 does not need to be removed every time the tool attached to the distal end face 15a is replaced. The calibration for detecting the position of the camera 16 needs to be performed only once after the camera 16 is mounted on the second arm 12, and another calibration of the camera 16 is unnecessary regardless of the condition of the tool, which is advantageous in that a troublesome start-up task at the worksite becomes unnecessary.

Making the dolly 6 movable is advantageous in that the robot 3 can be easily moved in accordance with the working status of the machining apparatus 2. When a human performs a task such as maintenance of the machining apparatus 2, the robot 3 can be easily moved to ensure a working space, which is advantageous.

A characteristic shape, an originally provided mark, or the like on the outer surface of the machining apparatus 2 can be used as the visual targets 5. Compared with a case where the visual targets 5 are provided separately from the machining apparatus 2, the effort and cost for providing the visual targets can be reduced. It is also possible to provide a new visual target on the outer surface of the machining apparatus 2. Compared with a case where the visual targets 5 are provided on a peripheral device or the like that is not the machining apparatus 2, the space can be used efficiently, leading to an advantage in that the robot system 1 according to this embodiment can be made compact.

In the robot system 1 according to this embodiment, although circular marks have been shown as an example of the visual targets 5, as described above, marks of another shape may be used as long as the feature points, such as the geometric center position or brightness center positon, can be detected, or some characteristic shapes of the machining apparatus 2 may be used as the visual targets 5. Although an example case where a plurality of visual targets 5 are provided on the machining apparatus 2 have been shown, instead, it is possible to provide a single visual target 5 on the machining apparatus 2.

Although it is preferable that the visual targets 5 be located on the front side of the machining apparatus 2 extending in the vertical direction, instead, the visual targets 5 may be located on a plane extending in the horizontal direction or on an inclined surface. The visual targets 5 may be disposed inside the machining apparatus 2.

In this embodiment, an example configuration in which the visual targets 5 are provided on the outer surface of the machining apparatus 2 has been shown. However, the visual targets 5 do not necessarily have to be provided on the outer surface of the machining apparatus 2, and the visual targets 5 only need to be provided at positions where the relative positions with respect to the machining apparatus 2 are predetermined. For example, the visual targets 5 may be provided on the floor surface on which the machining apparatus 2 is provided or on a peripheral device or the like whose relative position with respect to the machining apparatus 2 is predetermined.

Although the camera 16 is attached to the distal end of the second arm 12 in this embodiment, the configuration is not limited thereto. Because it is preferable that the visual targets 5 be arranged over a wide area for accurate measurement of the relative positional relationship between the robot 3 and the machining apparatus 2, the distal end of the second arm 12, which has a wide operating area, is preferred for capturing images of such visual targets 5.

Instead, the camera 16 may be attached to any of: the middle position or the base end portion of the second arm 12; the distal end, the middle position, or the base end portion of the first arm 11: or the swivel body 10, since the camera 16 attached to any of these positions can be moved over a predetermined operating area. The camera 16 may be attached to a portion except for the distal end face 15a of the wrist unit 8, for example, the first wrist shaft 13 or the second wrist shaft 14. In this case, the degree of freedom of moving the camera 16 is increased, and the camera 16 can be moved while the orientation thereof is maintained constant. This reduces the change of the relative orientation of the camera 16 with respect to the visual targets 5, improving the detection accuracy.

When the camera 16 is attached to a position that is substantially horizontal with respect to the floor surface, the camera 16 is constantly maintained substantially perpendicular to the visual targets 5 provided on the outer surface of the machining apparatus 2. Hence, the accuracy of detecting the visual targets 5 can be improved.

In this embodiment, an example configuration in which the robot operation is automatically compensated has been described. Instead, a user may compensate the operating position in the teaching program by operating the robot 3 to cause the camera 16 to capture images of the plurality of visual targets 5 provided on the front side of the machining apparatus 2.

In this embodiment, the robot 3 having the six-axis vertical articulated movable unit 7 has been shown as an example. However, the configuration is not limited thereto, and it is possible to employ a vertical articulated, horizontal articulated, or direct-drive robot having any number of axes.

When the robot 3 is a horizontal articulated robot, the camera 16 may be attached to a position substantially vertical to the floor surface. With this configuration, when the visual targets 5 are provided on a surface substantially parallel to the floor surface, the camera 16 is constantly held substantially vertical to a plane substantially parallel to the floor surface. Hence, the accuracy of detecting the visual targets 5 can be improved. The camera 16 may also be attached to a position substantially vertical to the floor surface when the robot 3 is a vertical articulated robot.

Although the machining apparatus 2 has been shown as an example work target device, the work target device is not limited thereto, and any other work target device with which the robot 3 works may be employed. Although the robot 3 having the dolly 6, which is a self-contained moving truck, has been shown as an example, the configuration is not limited thereto, and the robot 3 may be of a type in which the base 9 having the first axis A is directly fixed to the installation surface, such as the floor surface, after being transported, or a robot 3 loaded on a manually moved hand truck may be employed.

As a result, the following aspect is derived from the above described embodiment. An aspect of the present invention provides a robot including: a wrist unit that has a tool attached to a distal end face thereof and that changes the orientation of the tool, the tool performing work on a work target device secured to an installation surface; and a movable unit that changes the three-dimensional position of the wrist unit. The movable unit includes an arm that has a longitudinal axis and the wrist unit is attached to the distal end thereof. A visual sensor that has a field of view oriented in a direction intersecting the longitudinal axis of the arm is attached to a positon closer to the base end than the distal end face of the wrist unit is.

According to this aspect, the robot is installed with respect to the work target device secured to the installation surface, and the movable unit is operated. By changing the three-dimensional position of the wrist unit attached to the distal end of the arm of the movable unit, thus operating the wrist unit, it is possible to change the orientation of the tool attached to the distal end face and to perform work on the work target device with the tool. Because the field of view of the visual sensor is moved by the operation of the movable unit and/or the wrist unit, by providing a visual target at a position where the relative positional relationship with respect to the work target device is predetermined, it is possible to capture, with the visual sensor, an image of the target, to measure the relative positional relationship between the robot and the work target device, and thus to compensate the operating position of the robot with respect to the work target device.

In this case, because the visual sensor is not attached to the distal end face of the wrist unit, the degree of freedom of the orientation of the visual sensor decreases by at least the degree of freedom of the distal end face. However, by mounting the visual sensor so as to have a field of view oriented in a direction intersecting the longitudinal axis of the arm, even with the degree of freedom that is lower than the degree of freedom of the robot, it is possible to move the position of the visual sensor over a wide area in accordance with the operation of the arm. Thus, when a plurality of visual targets are provided, it is possible to capture images of the visual targets disposed at different positions, whereas when a single visual target is provided, it is possible to capture images thereof from a plurality of points of view by moving the visual sensor. The visual sensor is not attached to the distal end face, the influence on the weight capacity can be reduced, compared with a case where the visual sensor is attached to the distal end face or the tool. It is possible to reduce the space around the tool, and the wrist unit can be easily inserted into a narrow space. When the work target device is a machining apparatus that performs cutting, it is possible to make the camera less likely to be splattered with cutting fluid even if the wrist unit is inserted to the vicinity of the main shaft.

The visual sensor does not need to be removed every time the tool attached to the distal end face is replaced. The calibration for detecting the position of the camera 16 needs to be performed only once after the camera 16 is mounted on the second arm 12, and another calibration of the visual sensor is unnecessary regardless of the condition of the tool, which eliminates the need for a troublesome start-up task at the worksite.

In the above aspect, the movable unit may include a base that can be provided at any position with respect to the work target device, a swivel body that is supported so as to be rotatable about a vertical axis with respect to the base, and the arm that is supported so as to be rotatable about one or more horizontal axes with respect to the swivel body.

With this configuration, it is possible to change the three-dimensional position by operating the swivel body and two or more arms of the wrist unit. Even when the position with respect to the work target device is roughly set, it is possible to compensate the operating position of the robot by moving the three-dimensional position of the visual sensor mounted at a position closer to the base end than the distal end face of the wrist unit is by the operation of the movable unit, by capturing an image of the visual target provided at a position where the relative positional relationship with respect to the work target device is predetermined, and by measuring the relative positional relationship between the robot and the work target device.

In the above aspect, the arm may include a first arm that is supported so as to be rotatable about a horizontal axis with respect to the swivel body, and a second arm that is supported at the distal end of the first arm so as to be rotatable about a horizontal axis with respect to the first arm. The wrist unit is attached to the distal end of the second arm. With this configuration, by rotating the swivel body about the vertical axis with respect to the base, by rotating the first arm about the horizontal axis with respect to the swivel body, and by rotating the second arm about the horizontal axis with respect to the first arm, it is possible to move the wrist unit attached to the distal end of the second arm to any three-dimensional position. By providing the visual sensor near the distal end of the second arm, the visual sensor can also be moved to any three-dimensional position.

In the above aspect, the movable unit may include a base that can be provided at any position with respect to the work target device, a swivel body that is supported so as to be rotatable about a vertical axis with respect to the base, and the arm that is supported so as to be rotatable about one or more axes parallel to the axis of the swivel body. With this configuration, it is possible to ensure a wide arm-moving area on the floor surface. This is effective when the visual target is provided on a plane substantially parallel to the floor surface because a wide detection area is ensured.

In the above aspect, the robot may further include a truck to which the base is fixed and that moves the movable unit, the wrist unit, and the visual sensor with respect to the work target device. This configuration allows the robot loaded on the truck to move and to be moved to a different position with respect to the work target device by operating the truck.

By making the truck movable, the robot can be easily moved according to the working status of the work target device. When a human performs a task such as maintenance of the work target device, the robot can be easily moved to ensure a working space. In the above aspect, the truck may be a self-contained moving truck. In the above aspect, the truck may be a hand truck.

In the above aspect, the visual sensor may have a field of view oriented in a direction parallel to a plane substantially perpendicular to the longitudinal axis of the arm. With this configuration, by disposing the robot such that the arm extends substantially parallel to a surface of the work target device, the surface facing the robot, the direction in which the field of view of the visual sensor is oriented can be made substantially perpendicular to the work target device, and thus, it is possible to easily move the field of view to a plurality of positions by operating the movable unit.

In the above aspect, the visual sensor may be provided substantially horizontally. With this configuration, the visual sensor is constantly maintained substantially perpendicular to the visual target whose relative positional relationship with respect to the work target device is predetermined, in particular, the visual target that is provided on a plane perpendicular to an installation surface. Thus, the visual-target detection accuracy can be improved.

In the above aspect, the visual sensor may be disposed substantially vertically. With this configuration, when the visual target is provided on a surface substantially parallel to the floor surface, the visual sensor is constantly maintained substantially vertical to the surface substantially parallel to the floor surface. Hence, the visual-target detection accuracy can be improved. In the above aspect, the robot may be a horizontal articulated robot.

Another aspect of the present invention is a robot system including: a work target device secured to an installation surface; any one of the above-described robots that performs work on the work target device; and a compensating unit that compensates the operating position of the robot on the basis of the relative positional relationship between the robot and the work target device measured by capturing, with the visual sensor, an image of a visual target provided at a position where the relative positional relationship with respect to the work target device is predetermined.

According to this aspect, by providing the robot with respect to the work target device secured to the installation surface, by moving the field of view of the visual sensor by operating the movable unit and/or the wrist unit, and by capturing an image of the visual target provided at a position where the relative positional relationship with respect to the work target device is predetermined, it is possible to measure the relative positional relationship between the robot and the work target device and to compensate, with the compensating unit, the operating position of the robot with respect to the work target device.

In the above aspect, the visual target may be provided on an outer surface of the work target device. With this configuration, a characteristic shape, an originally provided mark, or the like on the outer surface of the work target device can be used as the visual target, and, compared with a case where the visual target is provided separately from the work target device, the effort and cost for providing the visual target can be reduced. It is also possible to provide a new visual target on the outer surface of the work target device. Compared with a case where the visual target is provided on a peripheral device or the like that is not the work target device, the space can be used efficiently, and the system can be made compact.

REFERENCE SIGNS LIST 1 robot system
2 machining apparatus (work target device)
3 robot
5 visual target
6 dolly (truck)
7 movable unit
8 wrist unit
9 base
10 swivel body
11 first arm (arm)
12 second arm (arm)
15a distal end face
16 camera (visual sensor)
A, B, C axis

What is claimed is:

1. A robot system comprising:
   a controller;
   a visual target provided on a predetermined surface where a relative position with respect to a work target device is predetermined, the work target device being secured to an installation surface;
   a robot that is operated according to a teaching program executed by the controller and includes a tool, performing work on the work target device, a wrist unit, and a movable unit, the tool being attached to a distal end of the wrist unit, and the wrist unit being attached to a distal end of the movable unit;
   wherein the visual target and the work target device are separate targets;
   wherein the teaching program is preliminarily generated on the basis of a first relative positional relationship between the robot and the work target device in a state in which the robot is disposed at a predetermined position; and
   a visual sensor that is attached to the movable unit or a portion except for a distal end face of the wrist unit;
   wherein the controller is configured to:
   when the robot is disposed at any position, before executing the teaching program, cause the visual sensor to capture the predetermined surface from a plurality of positions so as to acquire a plurality of images; determine whether or not the visual target is included in each of the plurality of images; and
   in response to determining that the visual target is included in each of the plurality of images, measure a second relative positional relationship between the robot and the work target device from the plurality of images and compensate an operating position of the robot in the teaching program on the basis of the measured second relative positional relationship.

2. The robot system according to claim 1, wherein the movable unit includes:
   a swivel body rotatable about a first axis;
   a first arm connected to the swivel body and rotatable about a second axis substantially perpendicular to the first axis; and
   a second arm connected to a distal end of the first arm and rotatable about a third axis parallel to the second axis, the second arm having a longitudinal axis perpendicular to the third axis;
   wherein the wrist unit is attached to a distal end of the second arm,
   wherein the visual sensor is attached to the second arm, and
   wherein, in response to determining that the visual target is not included in each of the plurality of images, the controller is configured to move at least one of the swivel body, the first arm, and the second arm so that the visual sensor captures the visual target.

3. The robot system according to claim 2, wherein the visual sensor is attached to the second arm such that the visual sensor includes a field of view oriented in a direction substantially perpendicular to the longitudinal axis and in a direction substantially parallel to the installation surface.

4. The robot system according to claim 1, wherein:
   in response to determining that the visual target is included in each of the plurality of images, the controller is configured to detect a coordinate of the visual target from the plurality of images and measure the second relative positional relationship by using the detected coordinate.

5. The robot system according to claim 1, wherein:
   the visual target comprises a plurality of visual targets provided in positions different from each other on the predetermined surface; and
   the controller is configured to determine that the visual target is included in each of the plurality of images when all the plurality of visual targets are included in each of the plurality of images.

6. The robot system according to claim 1, further comprising a truck that moves the robot with respect to the work target device.

7. The robot system according to claim 6, wherein the truck is a self-contained moving truck.

8. The robot system according to claim 6, wherein the truck is a hand truck.

* * * * *